United States Patent Office 3,555,045
Patented Jan. 12, 1971

3,555,045
2-SUBSTITUTED-1,3-DIOXOLANE COMPOUNDS AND METHOD FOR PREPARING SAME
Russell K. Griffith, Chagrin Falls, Romanas Zorska, South Euclid, and William O. Fitzgibbons, Hudson, Ohio, assignors to The Standard Oil Company, Cleveland, Ohio, a corporation of Ohio
No Drawing. Filed Mar. 22, 1968, Ser. No. 715,179
Int. Cl. C07d 13/04
U.S. Cl. 260—340.9            3 Claims

ABSTRACT OF THE DISCLOSURE

The novel herbicidal compounds, the 2-(haloalkly)-2-amino-1,3-dioxolanes are prepared in a one-step process by reacting an alpha-haloaliphatic nitrile with an alkylene glycol in the presence of an alkaline catalyst.

---

This invention relates to a novel group of 2-substituted-1,3-dioxolane compounds, and more particularly to 2-(haloalkyl)-2-amino-1,3-dioxolanes. This invention further relates to a novel one-step process for preparing 2-(haloalkyl)-2-amino-1,3-dioxolanes by reacting an alpha-haloaliphatic nitrile with an alkylene glycol in the presence of an alkaline catalyst. Also contemplated to be within the scope of this invention are the novel alkylene glycol-haloalkylimidates and the alkylene glycol-bis-haloalkylimidates which are also produced in the reaction of an alpha-haloaliphatic nitrile with an alkylene glycol.

Heretofore, other 1,3-dioxolanes have been prepared by the reaction of a glycol or a substituted glycol with a carbonyl compound such as a ketone or an aldehyde; by the addition of ethylene oxide to a carbonyl compound; or through the addition of a glycol to acetylene. However, none of the prior art processes will produce the 2-substituted-2-amino-1,3-dioxolanes of our invention. We have discovered that an alpha-haloaliphatic nitrile will react with ethylene glycol or a substituted ethylene glycol in the presence of an alkaline catalyst to form the cyclic 2-(haloalkyl)-2-amino-1,3-dioxolane rather than the expected linear polyimidate.

The reaction believed to be involved in forming the products, the alkylene glycol haloalkylimidates, the alkylene glycol-bis-haloalkylimidates, and the 2-(haloalkyl)-2-amino-1,3-dioxolanes, is represented by the following equation:

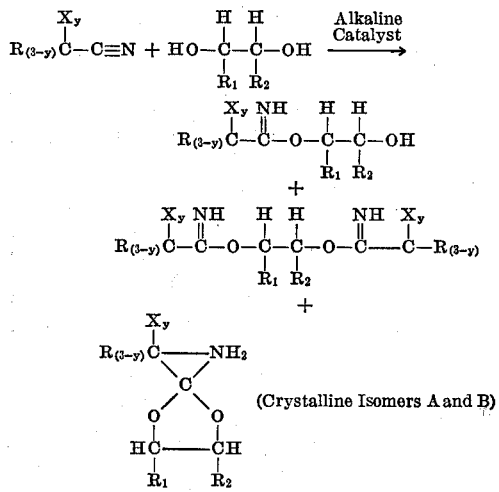

In the foregoing formula, X is a halogen; y is an integer of from 1 to 3; and R is hydrogen, an alkyl or a haloalkyl radical. When R is an alkyl radical, the alkyl radical contains from 1 to 3 carbon atoms. Preferably, X is chlorine, but is not necessarily limited to chlorine. $R_1$ and $R_2$ may be hydrogens or alkyl groups containing from 1 to 3 carbon atoms.

Examples of alpha-haloaliphatic nitriles suitable for this reaction include monochloroacetonitrile, dichloroacetonitrile, trichloroacetonitrile, 2-chloropropionitrile, 2-chlorobutyronitrile, 2,2 - dichloropropionitrile, 2,2,3-trichloropropionitrile, 2,3,3 - trichloropropionitrile and the like.

The alkylene glycol employed in this reaction may be ethylene glycol or a substituted ethylene glycol, wherein the hydroxyl groups are attached to adjacent carbon atoms. The substituted glycols useful in this invention include propanediol-1,2; butanediol-1,2; butanediol-2,3; pentanediol-1,2; pentanediol-2,3; 2-methyl-2,3-butanediol; 4-pentene-1,2-diol and similar diols.

The catalyst is a strongly alkaline compound such as hydrazine, an alkali metal hydroxide, oxide or alcoholate, an alkali metal salt of an amide or cyanide, or a quaternary ammonium. The alkali metal may be lithium, sodium or potassium and preferably sodium.

Specific novel compounds of this invention include the following:

The 2-(haloalkyl)-2-amino-1,3-dioxolanes:

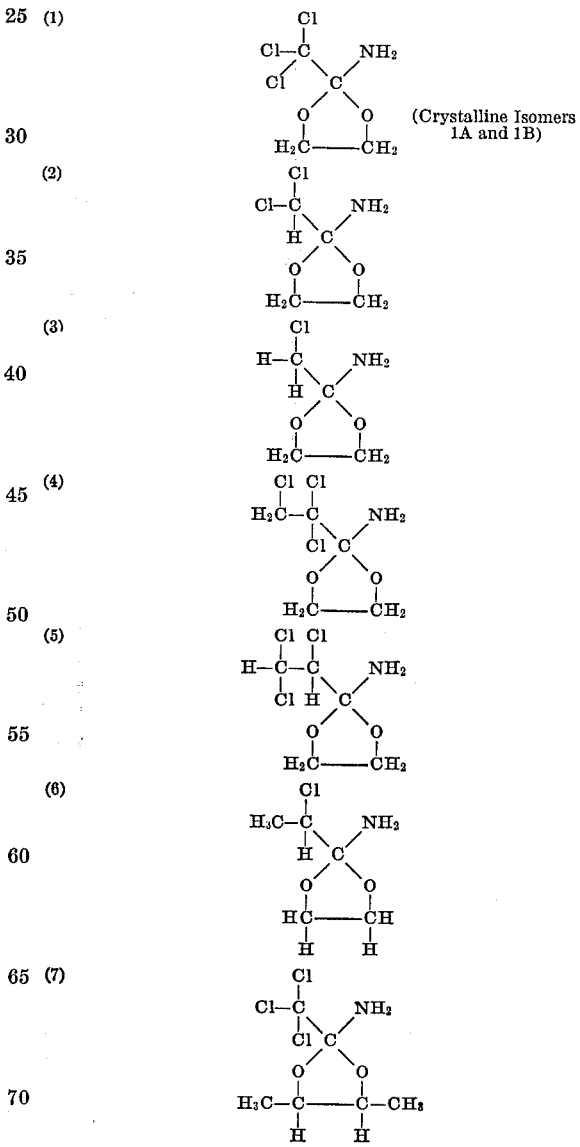

(8) 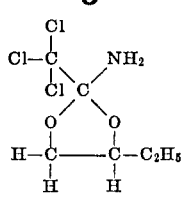

The alkylene glycol-bis-haloalkylimidates:

(9) 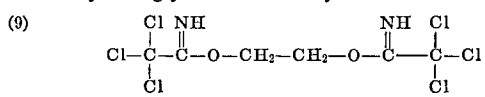

(10) 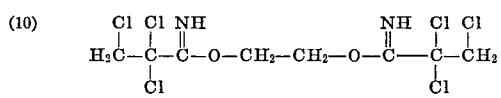

(11) 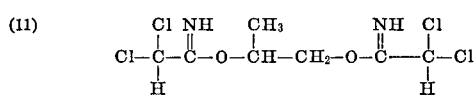

The alkylene glycol-haloalkylimidate:

(12) 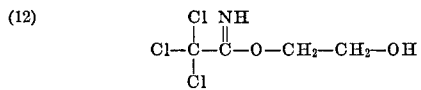

In the preparation of the compounds of this invention, essentially equimolar quantities of the nitrile and the glycol are mixed in the substantial absence of oxygen. The alkaline catalyst is added to the mixture in amounts ranging from 0.0001 to 0.10 mole and preferably from 0.001 to 0.05 mole per mole of the nitrile or the glycol. On addition of the catalyst, a vigorous exothermic reaction is initiated. The reaction mixture is then stirred for a period of approximately ten minutes to several hours and preferably for about one-half hour to about two hours. The reaction may be carried out over a broad temperature range, depending upon the melting points and boiling points of the starting materials. However, moderate temperatures ranging from about −20° C. to about 120° C. are preferred. The alkylene glycol-haloalkylimidate of the foregoing equation is formed below room temperatures and is converted to the cyclic 1,3-dioxolane at higher temperatures. In the reaction carried out below room temperature the 2-substituted-2-amino-1,3-dioxolane is obtained as what appears to be a mixture of two crystalline isomers, isomer A, and isomer B. These isomers can be separated, if desired, by a combination of steps involving vacuum distillation and solvent extraction. If the reaction is carried out above room temperature, only isomer B is isolated. Crystalline isomer B appears to be the more stable form as indicated by the yield ratio of the isomers, and by the conversion of isomer A to isomer B on heating. The isomers may be conveniently separated and purified by vacuum distillation of the product mixture and extraction of the distillate with a paraffinic hydrocarbon, such as n-pentane. Crystalline isomer A is soluble in n-pentane while crystalline isomer B is insoluble in n-pentane but soluble in an aromatic solvent such as benzene.

The following examples will illustrate in greater detail the method of preparation of these compounds. The chemical structure of the compounds was identified by nuclear magnetic resonance and infrared analysis, and was verified by elemental analysis.

EXAMPLE I 144.4 grams (1.0 mole) of trichloroacetonitrile and 62.07 grams (1.0 mole) of ethylene glycol were stirred in an ice bath under a nitrogen atmosphere. Sodium cyanide (0.27 gram, 0.0055 mole) was added, initiating a vigorous exothermic reaction. The viscous reaction mixture was stirred for one hour, then vacuum distilled (boiling point 110–125° C./1–17 mm. Hg) yielding 186.8 grams of the mixed isomers of 2-amino-2-trichloromethyl-1,3-dioxolane [compound (1)A, (1)B] as well as a large amount of ethylene glycol-bis-trichloroacetoimidate [compound (9)] and ethylene glycol, leaving 4.9 grams of a dark brown residue. The distillate was washed with about 700 mls. of n-pentane leaving 95.5 grams of a crystalline residue of isomer [(1)B] (melting point 59–67° C.). The crystals were dissolved in 450 mls. of benzene yielding a two-phase (liquid-liquid) mixture. The upper benzene layer was removed by decantation leaving 4.6 grams of a lower oil layer which was found to be mainly ethylene glycol. The colorless benzene solution was then vacuum distilled to remove the solvent, yielding 79.9 grams (38.2 percent) of crystalline isomer [(1)B] (melting point 69.0–70.5° C., boiling point 100° C./6 mm. Hg), and 7.8 grams of compound [(9)].

The pentane solution containing compounds [(9)] and crystalline isomer [(1)A] was vacuum distilled at room temperature, yielding a residue of 78.0 grams (37.8 percent) of the compound [(9)] (boiling point 90–100° C./6 mm. Hg) and 0.5 gram of crystalline isomer [(1)A] (melting point 66.5–69.0° C.).

EXAMPLE II

The previous Example I was repeated and yielded 21.8 grams of ethylene glycol-bis-trichloroacetoimidate [(9)], 42.1 grams of 2-amino-2-trichloromethyl-1,3-dioxolane, isomer [(1)A] (melting point 67.5–70.0° C.), and 39.0 grams of isomer [(1)B] (melting point 69.0–71.0° C.). Elemental analysis of these compounds gave the following:

Compound [(9)]:
  20.5% C found and 20.5% C theoretical
  1.99% H found and 1.73% H theoretical
  7.7% N found and 8.0% N theoretical
  58.7% Cl found and 60.5% Cl theoretical Compound [(1)A]:
  22.8% C found and 23.3% C theoretical
  2.91% H found and 2.93% H theoretical
  6.70% N found and 6.8% N theoretical
  50.06% Cl found and 51.4% Cl theoretical Compound [(1)B]:
  22.9% C found and 23.3% C theoretical
  2.71% H found and 2.93% H theoretical
  6.89% N found and 6.8% N theoretical
  50.73% Cl found and 51.4% Cl theoretical

EXAMPLE III 144.4 grams (1.0 mole) of trichloroacetonitrile and 62.1 grams (1.0 mole) of ethylene glycol were charged to an ice bath cooled reactor fitted with a stirrer, nitrogen inlet, thermometer and reflux condenser. 0.5 gram (0.0102 mole) of sodium cyanide was added with stirring. An exothermic reaction followed causing the reaction temperature to rise to 85° C. The reaction mixture became viscous and changed in color from white to orange. After the reaction subsided the mixture was stirred for an additional ten minutes and then heated to 90° C., with stirring, for one hour. During this time the orange color deepened to a dark brown coloration. The reaction product was vacuum distilled to 140° C./0.5 mm. Hg, leaving a brown residue (1.8 grams) and a colorless distillate comprising a solid and a liquid (195.6 grams). The liquid was decanted leaving 108.9 grams (52.8 percent yield) of the crude 2-amino-2-trichloromethyl-1,3-dioxolane [(1)]. The crystals were treated with 200 mls. of water and upon heating a two-phase liquid-liquid mixture was obtained. The product crystallized on cooling. The recrystallization procedure was repeated and the colorless crystals obtained were vacuum dried yielding 58.2 grams (28.2 percent) of a product with a melting point of 59–67° C. Infrared analysis indicated the crystals to be the crystalline isomer [(1)B]. Vacuum sublimation of these crystals gave a product with a melting point of 69.0–70.2° C.

The liquid portion of the distillate was extracted with water yielding 100.3 grams of a pale yellow, viscous liquid. Infrared analysis showed this material to be mainly ethylene glycol-bis-trichloroacetoimidate [(9)]. Infrared analysis also indicated the presence of the monoimidate, ethylene glycol trichloroacetoimidate, [(12)], prior to heating and the absence of [(12)] after heating to 90° C. for one hour. The liquid was cooled to —5° C. yielding an additional 13.1 grams of isoheptane insoluble crystals of isomer [(1)B], and on standing for nine days, an additional 11.7 grams separated. The overall yield of the isomer [(1)B] was therefor equivalent to 40.2 percent.

EXAMPLE IV 158 grams (1 mole) of 2,2,3-trichloropropionitrile and 62 grams (1 mole) of ethylene glycol were stirred in a reactor under a nitrogen atmosphere. 1 gram (0.02 mole) of sodium cyanide was added whereupon the mixture was heated to 70° C. for one hour. The reaction mixture was then vacuum distilled at 52° C./5–15 mm. Hg to remove unreacted starting materials. The vacuum distillation was continued to 170° C. at 0.5 mm. Hg giving 9 grams (4.1 percent) of colorless liquid that upon addition to n-pentane yielded transparent colorless crystals of 2-amino-2[2,2,3,-trichloroethyl]-1,3-dioxolane [(4)]. The crystals melted at 56.0–59.0° C. The infrared spectrum of these crystals indicated the characteristic $NH_2$ absorption at 3.0 and 2.93 microns (3410 and 3340 cm.$^{-1}$) and the ether linkage absorption at 8.38 and 9.3 microns (1190 and 1070 cm.$^{-1}$).

The 2-(haloalkyl)-2-amino-1,3-dioxolane compounds of this invention are useful as monomers in the formation of polyurethane resins.

In a typical example 8.1 grams of 2-amino-2-trichloromethyl-1,3-dioxolane [(1)B] were reacted with freshly distilled tolylene-2,4-diisocyanate 150° C. The reaction mixture foamed, became viscous, and then solidified to an insoluble polymer.

The 2-(haloalkyl)-2-amino-1,3-dioxolane compounds are also useful as herbicides and are effective when used in concentration of approximately 100 pounds per acre.

Compound 2 - amino - 2-trichloromethyl-1,3-dioxolane (isomers (1)A and (1)B) was evaluated in post-emergent herbicide tests in which the seeds of crops, grasses, and weeds were planted at various intervals so that germination occurred at the same time for all plants. These crops, grasses, and weeds consisted of corn, cotton, soybean, brome, sugar beets, wheat, oats, peanuts, potatoes, quack grass, Johnson's grass, water grass, Jimson weed, smart weed, pigweed, foxtail, cockelbur, lambsquarter, and ragweed. When the plants were approximately one inch in height, they were sprayed with solutions of the above compounds in concentrations equivalent to 1000 pounds and 100 pounds per acre. The plants were then rated for damage the following day and subsequently after a period of two weeks. At concentrations of 1000 pounds and 100 pounds per acre all of the crops, grasses, and weeds were killed.

We claim:

1. The compound having the formula:

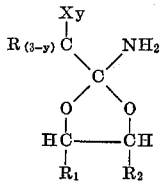

wherein X is chlorine, $y$ is an integer of 1 to 3, R is hydrogen, a methyl or a chloromethyl radical, and $R_1$ and $R_2$ are hydrogen or an alkyl radical containing from 1 to 2 carbon atoms.

2. The compound of claim 1 wherein $y$ is equal to 3.

3. A process for the preparation of 2-(chloroalkyl)-2-amino-1,3-dioxolanes comprising reacting a lower aliphatic alpha-chloronitrile selected from the group consisting of alpha-chloroacetonitriles and alpha-chloropropionitriles, with ethylene glycol or an alkyl substituted ethylene glycol wherein the alkyl group contains from 1 to 2 carbon atoms, in the presence of an alkaline catalyst consisting of sodium cyanide.

References Cited

UNITED STATES PATENTS 2,972,620  2/1961  Simmons _____ 260—340.9
3,138,616  6/1964  Scotti et al. _____ 260—340.9

ALEX MAZEL, Primary Examiner

J. H. TURNIPSEED, Assistant Examiner

U.S. Cl. X.R.

71—88; 260—77.5, 453